B. E. RICHARDSON.
GEAR SHIFTING APPLIANCE.
APPLICATION FILED MAR. 13, 1918.

1,371,644.

Patented Mar. 15, 1921.
2 SHEETS—SHEET 1.

Inventor
Bayard E. Richardson
By Moulton & Lunau
Attorneys.

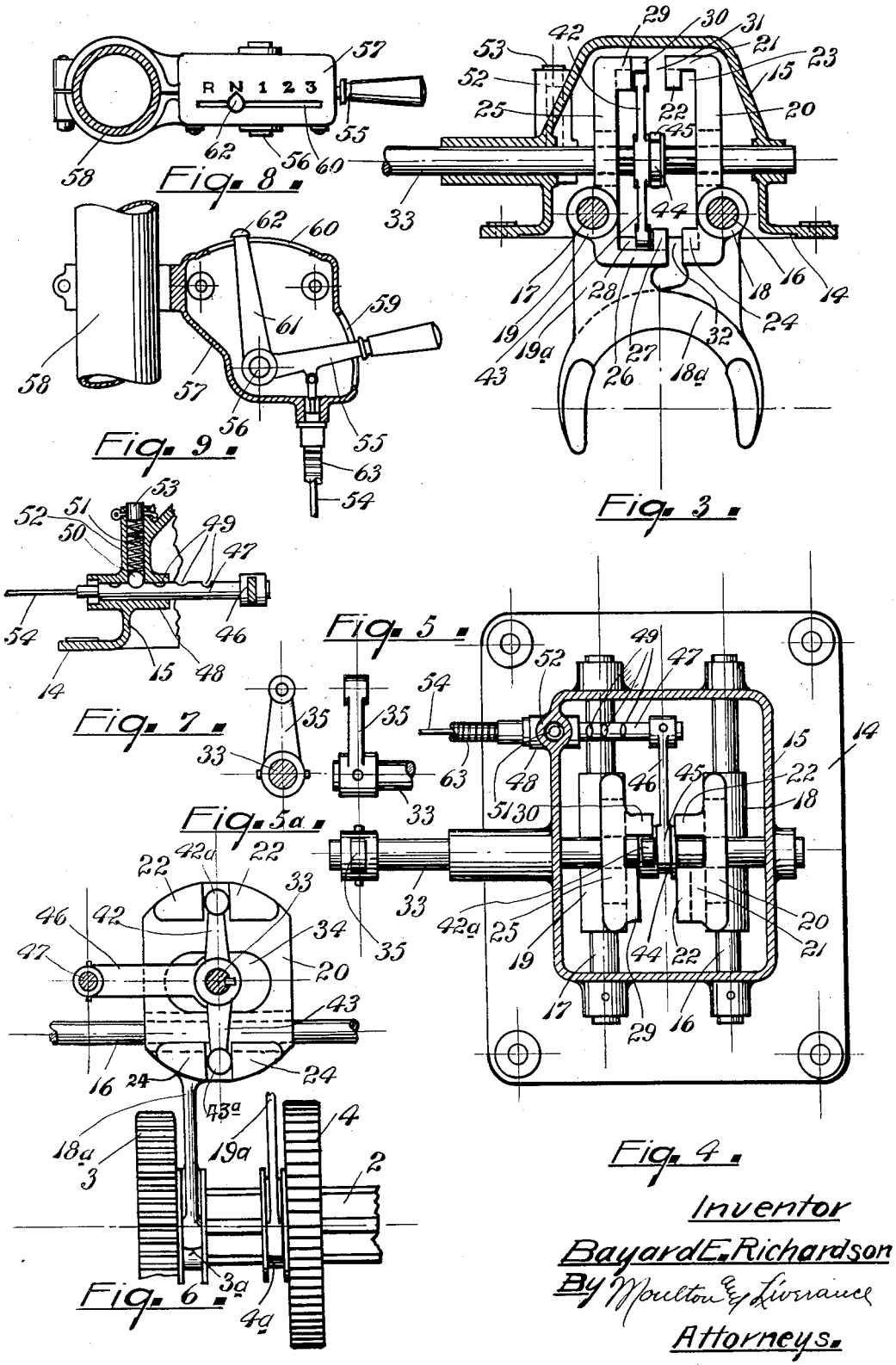

UNITED STATES PATENT OFFICE.

BAYARD E. RICHARDSON, OF GRAND RAPIDS, MICHIGAN.

GEAR-SHIFTING APPLIANCE.

1,371,644.      Specification of Letters Patent.      Patented Mar. 15, 1921.

Application filed March 13, 1918. Serial No. 222,127.

*To all whom it may concern:*

Be it known that I, BAYARD E. RICHARDSON, a citizen of the United States of America, residing at Grand Rapids, in the county of Kent and State of Michigan, have invented certain new and useful Improvements in Gear-Shifting Appliances; and I do hereby declare the following to be a full, clear, and exact description of the invention, such as will enable others skilled in the art to which it appertains to make and use the same.

This invention relates to a gear shifting mechanism, being especially directed to a mechanism for selecting and shifting gears in a sliding gear transmission such as is used in many types of motor vehicles. It is a primary object and purpose of the present invention to provide a very simple and effective mechanism of this character and one which may be economically constructed and installed, and to further provide the same with many novel features of construction and arrangement of parts for effectively attaining the ready shift of gears, all of which will more fully appear as the description progresses in connection with the accompanying drawings showing a preferred embodiment of the invention in which, Figure 1 is a plan view of a unit transmission construction for motor vehicles equipped with my invention.

Fig. 3 is a vertical transverse section through the shifting apparatus

Fig. 4 is a similar horizontal section therethrough.

Figure 1:
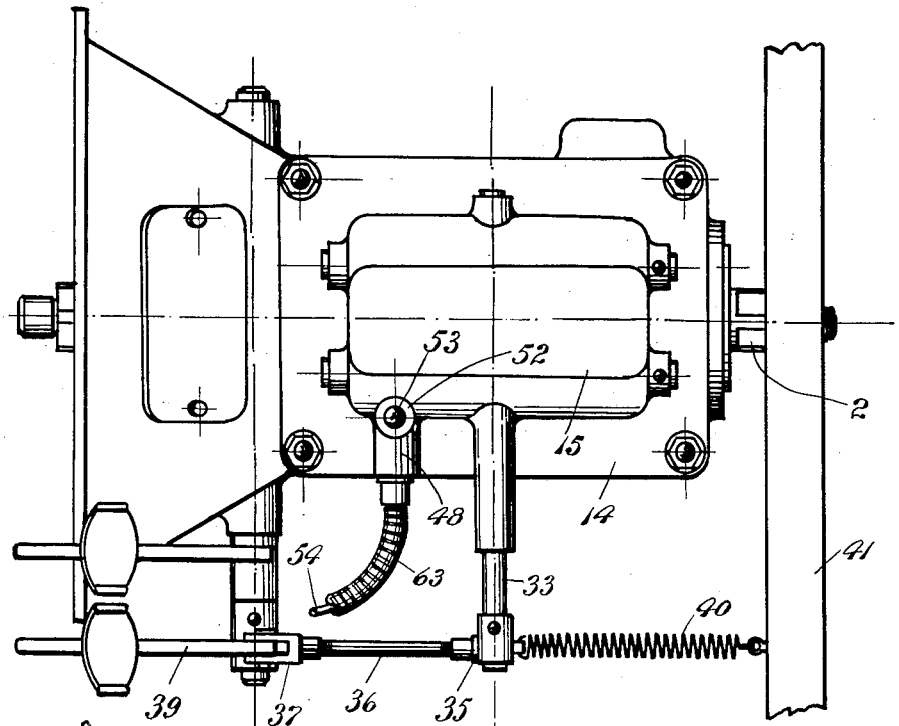
Figure 2:
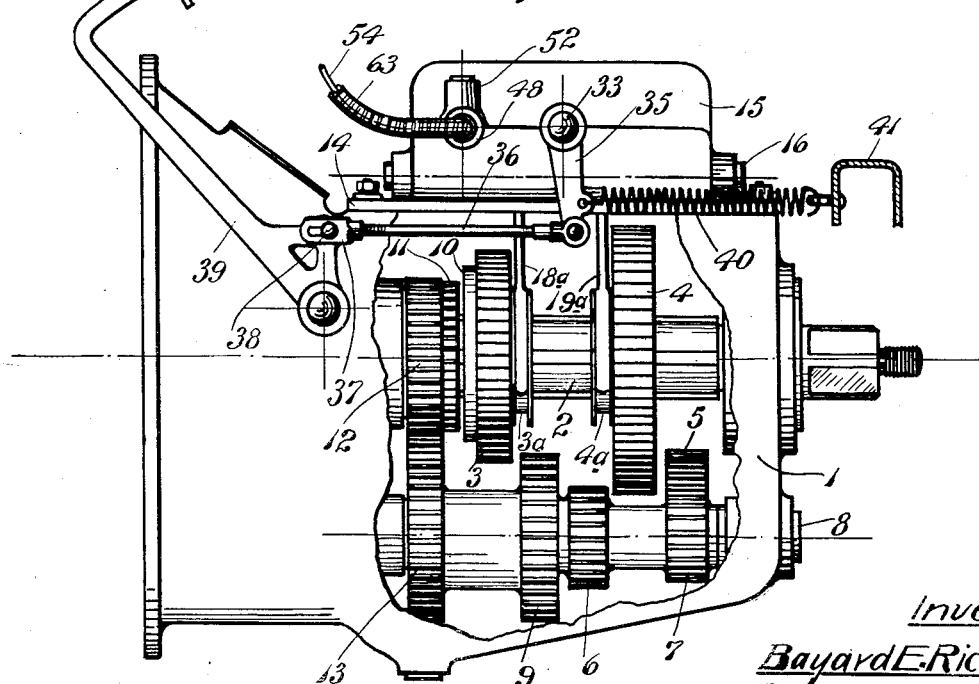
Fig. 2 is a side elevation thereof, parts being broken away to disclose the transmission gearing.

Figs. 5 and 5ᵃ are side and end views of a detail of structure of the shifting mechanism.

Fig. 6 is a side elevation of one of the shifting devices, showing its operative connection with one of the shiftable gears.

Fig. 7 is a vertical section illustrating a detail of construction for yieldingly holding the selector mechanism in any position to which it may be adjusted.

Fig. 8 is a partial plan and sectional view, and Fig. 9 is a partial vertical section and side elevation of the manually operated selector mechanism.

Like reference characters refer to like parts in the different views of the drawings.

The sliding gear transmission is, preferably, located within a housing or casing 1 which also covers the clutch (not shown) of the motor vehicle, this being a common and well known structural feature in certain types of motor vehicle constructions known as the "unit transmission" type. A main shaft 2 is mounted lengthwise of the casing 1 on which two gears 3 and 4 are splined so as to move lengthwise of the shaft but be rotatable therewith. The rear gear 4 is adapted at its rear and front positions of movement to mesh, respectively, with an idle pinion 5 and with a gear 6, the latter of which together with a second gear 7 is fixed on a jack or counter-shaft 8 mounted lengthwise of the casing below the shaft 2, pinion 5 being in mesh with the gear 7. The forward gear 3 in its rear position meshes with a gear 9, also secured to the shaft 8, and in its forward position an extension 10 thereof meshes with a gear 11 which is either integral with or secured at the back of a gear 12 fixed on the engine shaft and always in mesh with a gear 13 also secured on the shaft 8. This is a common and well known type of sliding gear transmission by which three speeds forward and one reverse are obtained, the reverse being obtained by meshing the gear 4 with the pinion 5, the first speed forward by meshing gear 4 with the gear 6, the second speed forward by meshing gear 3 with gear 9, and the third speed forward by connecting the part 10 with the gear 11 as is well known to those skilled in the art.

The transmission casing or housing 1 has an open upper side normally closed by a cover plate 14, integral with which is formed a second housing 15 which projects upwardly from the plate. Two rods 16 and 17, in spaced apart relation, are secured lengthwise of the housing immediately above the opening in the gear casing, on which sleeves 18 and 19, respectively, are slidably mounted. A yoke 18ᵃ is formed integral with the sleeve 18 engaging with a collar 3ᵃ connected with gear 3 and, similarly, a yoke 19ᵃ is cast integral with and depends from the sleeve 19 having connection with a collar 4ᵃ connected to the gear 4.

A plate 20 is formed integral with the sleeve 18 and extends upwardly therefrom and at its upper edge is turned at right angles, as indicated at 21, and thence extends downwardly being divided to form spaced apart blocks or shoulders 22, as shown, between which and the body of the plate 20, a groove or slot 23 is made. This plate 20 also extends slightly below the sleeve 18 and is turned inwardly and formed with two spaced apart blocks 24 which lie directly below the groove 23. Likewise, a plate 25 is cast integral with the sleeve 19 extending above the same and turned toward the part 21 of the opposite plate 20 and formed with two spaced apart blocks or shoulders 29 which, in the neutral position of the gears, lie directly opposite the blocks 22. From one of the block 29 a projection 30 extends toward the opposite block 22, terminating short thereof, however, and leaving a space 31 between them. Below the sleeve 19 the plate 25 extends at right angles toward the opposite plate 20, as indicated at 26, and terminates in two upwardly extended and spaced apart blocks 27 which are separated from the body of the plate 25 by a relatively wide groove 28. It will be noted that the blocks 27 come directly below the space 31 and that the lower blocks 27 and 24 of the two members are separated by a space 32 which comes directly below the upper blocks or shoulders 22; that the shoulders 24 lie directly below the groove 23 and that the combined thickness of the shoulder 29 and the projection 30 is substantially equal to the width of the groove 28 directly above which they are positioned.

A shaft 33 is rotatably mounted in and extends transversely through the housing 15 passing through elongated openings 34 in the two plates 20 and 25. At one end of the shaft outside of the casing, an arm 35 is fixed to the shaft depending therefrom, to which one end of a rod 36 is pivotally connected, said rod extending forward and at its front end having a slotted member 37 secured thereto, through the slot of which, a pin 38 carried on a clutch pedal lever 39 extends. A coil spring 40 under tension is attached to the arm 35 at one end, and at its rear end is secured to any suitable relatively stationary portion of the motor vehicle frame, such as indicated at 41, the tendency of which is to draw the arm to the rear. It will be noted in this connection that the clutch pedal may have a limited forward movement sufficient to operate the clutch without any effect being produced on the arm 35 and associated parts.

Within the casing 15 and between the plates 20 and 25, an actuating member is splined on the shaft 33, it having upwardly and downwardly extending arms 42 and 43 which terminate, respectively, in heads 42ª and 43ª. The heads are of a size such that they are adapted to pass between the shoulders 22, 29, 24 or 27, and are of a thickness such as to freely pass through any of the grooves or spaces 23, 31, and 32. A collar 44 is attached to the actuating member with which a yoke 45 formed at the rear end of an arm 46 engages, said arm at its front end being permanently connected to a rod 47 which passes through and is slidably mounted in a sleeve 48 formed integral with one side of the casing 15. The shaft 47 and attached arm 46 are adapted to be moved to any one of five different positions which are determined by spaced apart notches 49 cut in a side of the rod 47 with which a ball 50 engages, the same being pressed into the notches by a spring 51 housed within a projecting portion 52 on the casing 15, said spring being held under compression between the ball and a plug 53 in the upper end of the portion 52, as shown in Fig. 7.

A flexible rod 54, preferably of spring steel, is connected to the rod 47 leading therefrom to a selector lever 55 pivotally mounted at one end on a shaft 56 which is located transversely of and within a housing 57 attached to any relatively stationary part of the vehicle, such as the steering post 58. The housing 57 is slotted at 59 on its rear side and at 60 on its upper side, the lever 55 passing through the slot 59, while an indicator arm 61 fixed on the shaft 56 extends through the slot 60 and terminates in a pointer 62 which in the movement of the selector lever 55, moves back and forth with relation to certain indicating characters on the upper side of the housing located alongside of the slot 60. These characters indicate the speed which is selected, either reverse, neutral, or first, second, or third forward speeds. The rod 54 is contained within a flexible tubing 63 which closely engages the rod and frictionally resists movement thereof whereby any positions to which the selector lever or the actuating member are moved are retained, helped of course by the spring actuated ball catch 50. The rod 54 may by this construction be utilized to move the actuating member in either direction and the rod is rendered capable of transmitting either a pulling or pushing force and yet be bent into various forms for ready connection of the selector lever and actuating rod 47.

In operation of the gear shifting mechanism, the clutch pedal is moved forward to its extreme forward limit, whereupon the shaft 33 is rotated and with it the actuating member comprising the arms 42 and 43. If the gearing is not in neutral position, the effect of the rotation imparted to shaft 33 is to bring the gears to neutral position. This is apparent when it will be noted that no matter where the actuating member may be placed, it will in every case on forward operation of the clutch member to its extreme forward movement, engage either with one of the shoulders 22, 24, 27, and 29, or the projection 30, except in the one instance where the gearing already is in neutral position. This insures, when the clutch pedal is operated to its extreme forward position, that the gearing is placed in neutral, with the two plates 20 and 25 positioned directly opposite each other such that the actuating member may be moved to any of its five positions. With the clutch pedal in extreme forward position, the driver may then grasp the lever 55 and move the same to any speed desired, either first, second, or third forward speeds, the reverse speed, or to neutral, whereupon the actuating member is moved to the proper position for the gear selected such that on release of the clutch pedal, the shifting of the gear takes place. For instance, if the actuating member is moved so that the head 43ª passes between the lower blocks or shoulders 24, it will be noted that the upper head 42ª is free to move in the groove 23, and on return of the clutch pedal to normal position, head 43ª bears against one of the shoulders 24, thereby moving the plate 20, sleeve 18, yoke 18ª and the gear 3 associated with the yoke into engagement with a gear of the transmission to accomplish the selected shift. For the next shift, the clutch pedal is operated to its extreme forward position, this neutralizing the gears, after which the actuating member may be moved to any other position by operating the lever 55, the shift that is made being that selected by the driver of the vehicle when he stops the selector lever 55 at the indicated position for the shift.

The construction described is relatively simple and may be produced and installed at a low cost. The only springs used are the one used with the ball 50, and this is not subject to any severe usage such that it is liable to break or otherwise become useless, and the spring 40 which is subject to little strain and which can be almost instantly replaced if it should ever become necessary. The speed which is in effective operation is indicated directly in front of the driver, and the selection and shift of the gearing may be accomplished very rapidly and efficiently. Various changes in constructive detail may be resorted to without departing from my invention and I, accordingly, do not wish to be limited to the exact specific structure shown, but consider myself entitled to all modifications of structure which fall within the scope of the appended claims defining the invention.

I claim:

1. In a gear shifting mechanism, a gear casing, a cover therefor having a raised housing above the gear casing, a gear movably mounted in the gear casing, a rod secured in the housing, a member slidably mounted on the rod and connected to said gear, an actuating member movably mounted in the housing, means for operating said actuating member, and means to move the actuating member to make either of two connections with said first mentioned member for moving the same in either of two directions on operation of the actuating member.

2. In a gear shifting mechanism, two gears slidably shiftable in either of two directions, two rods located above the gears, two members slidably mounted one on each rod and connected one with each gear, an actuating member located between said two members and mounted to move toward or away from either of said members, means for moving said actuating member to make either of two connections with said two members, means for operating the actuating member and means on said two members for preventing movement of the actuating member toward or away from said members except when both members are in neutral position, substantially as described.

3. In a gear shifting mechanism, a gear casing including a cover having a raised housing portion, an actuating member movably mounted within said housing portion adapted to make either of two connections with gears in the casing, a rod slidably mounted in a side of the housing portion, connections between the rod and the actuating member, means to yieldingly retain the rod and associated parts in any one of a plurality of positions to which they may be moved, a flexible rod connected to the first rod, a flexible tubular housing therefor, and means for moving said flexible rod in either direction, substantially as described.

4. In a gear shifting mechanism, a plurality of gears shiftable in two directions, parallel spaced apart rods located above the gears, a member slidably mounted on each rod and each connected with a gear, a shaft rotatably mounted above and transversely of the rods, an actuating member splined on the shaft, means to turn the shaft and associated actuating member a limited distance, means to return the shaft to normal original position, and means to move the actuating member along the shaft to make either of two connections with each of said slidably mounted members, to thereby move their connected gears in either of two directions, substantially as described.

5. In a gear shifting mechanism, two gears slidably shiftable in two directions, two rods located above the gears, members slidably mounted one on each rod and connected one with each gear, a shaft rotatably mounted above and transversely of said rods, said shaft extending through elongated openings in said members, an actuating member splined on the shaft and located between said members, means to move the actuating member lengthwise of the shaft to make either of two connections with each member, means for turning the shaft to bring any member with which it is connected to an intermediate position between its two extreme positions of movement, and means to return the shaft to normal position on release of said shaft turning means, substantially as described.

6. In a gear shifting mechanism, two gears slidably shiftable in two directions, two rods located above the gears, a member comprising a sleeve, a downwardly extending yoke and an upwardly extending plate slidably mounted on each rod, said yokes connecting one with each gear and said sleeves receiving each a rod, upper and lower spaced apart blocks formed on the face of one plate, said upper blocks being located in a different vertical plane than the lower blocks, upper and lower spaced apart blocks on the adjacent face of the other plate and similarly located in different vertical planes, a projecting portion on one of the upper blocks of said last mentioned blocks lying in a plane between the last mentioned upper and lower blocks, an actuating member movably mounted between said plates, means to operate the same, and means to move the same to five different positions in two of which it connects with the first plate and in three of which it connects with the last plate, substantially as and for the purpose described.

7. In a gear shifting mechanism, two gears slidably shiftable in two directions, two members movably mounted and connected one with each gear, an actuating member disposed between the two members and movable to make either of two connections with each of said two first mentioned members, means for moving said actuating member to make said connections, means for operating the actuating member to shift either member and its associated gear to either of two different positions, and means on said first members for preventing movement of the actuating member to make connections with said members except when the gears are all in neutral position, substantially as described.

8. In a gear shifting mechanism, two gears slidably shiftable in two directions from neutral position, two members movably mounted and connected one with each gear and having parts extending toward each other and terminating in different vertical planes, each of said parts being centrally divided, and the parts in each member extending toward each other being separated a short distance, an actuating member mounted between the two members and movable toward or away from the same, said actuating member having a thickness slightly less than the distance between said parts of the two members, whereby one end of the actuating member is always engaged at one end with one of said first two members and cannot be moved toward or from the members except when the gears are all in neutral position, and means for operating the actuating member to move either of the first two members in either of two directions, substantially as described.

9. In a gear shifting mechanism, a gear casing, a plurality of gears therein shiftable in two directions, a cover for the casing, a plurality of members movably mounted in the cover and connected one with each shiftable gear, an actuating member mounted to move toward or away from each of said first members and make either of two connections therewith, said actuating member being movable to make such connections only when the gears are all in neutral position, and means for operating said actuating member to move any of the first mentioned members in either of its two directions of movement, substantially as described.

In testimony whereof I affix my signature.

BAYARD E. RICHARDSON.